United States Patent
Cheng et al.

(10) Patent No.: US 12,379,920 B2
(45) Date of Patent: Aug. 5, 2025

(54) BIOS UPDATE SYSTEM

(71) Applicant: Dell Products L.P., Round Rock, TX (US)

(72) Inventors: Po-Yu Cheng, Tainan (TW); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 18/183,323

(22) Filed: Mar. 14, 2023

(65) Prior Publication Data

US 2024/0311138 A1 Sep. 19, 2024

(51) Int. Cl.
*G06F 8/654* (2018.01)
*G06F 9/4401* (2018.01)

(52) U.S. Cl.
CPC ............ *G06F 8/654* (2018.02); *G06F 9/4403* (2013.01)

(58) Field of Classification Search
CPC .............................. G06F 8/654; G06F 9/4403
USPC .................................................... 717/168–173
See application file for complete search history.

(56) References Cited

U.S. PATENT DOCUMENTS

| | | | |
|---|---|---|---|
| 9,507,581 B2 | 11/2016 | Butcher et al. | |
| 2020/0356357 A1* | 11/2020 | Narasimhan | G06F 15/167 |
| 2023/0305834 A1* | 9/2023 | Kumar | G06F 8/65 |

FOREIGN PATENT DOCUMENTS

WO  WO-2022231584 A1 * 11/2022 .......... G06F 11/2284

\* cited by examiner

*Primary Examiner* — Ted T. Vo
(74) *Attorney, Agent, or Firm* — Joseph Mencher

(57) ABSTRACT

A BIOS update system includes a BIOS update subsystem that is coupled to a memory system and a BIOS. The BIOS update subsystem receives a BIOS update instruction and, in response, provides a BIOS update identifier in a non-volatile storage device that is accessible to the BIOS, provides a UEFI variable for the BIOS that identifies a location of BIOS update information in a storage device that is coupled to the BIOS update subsystem, and then causes a first reboot. Subsequent to the first reboot, the BIOS update subsystem identifies the BIOS update identifier in the non-volatile storage device and, in response, uses the location of the BIOS update information in the storage device identified by the UEFI variable to retrieve the BIOS update information. The BIOS update subsystem then updates the BIOS using the BIOS update information, and then causes a second reboot.

20 Claims, 14 Drawing Sheets

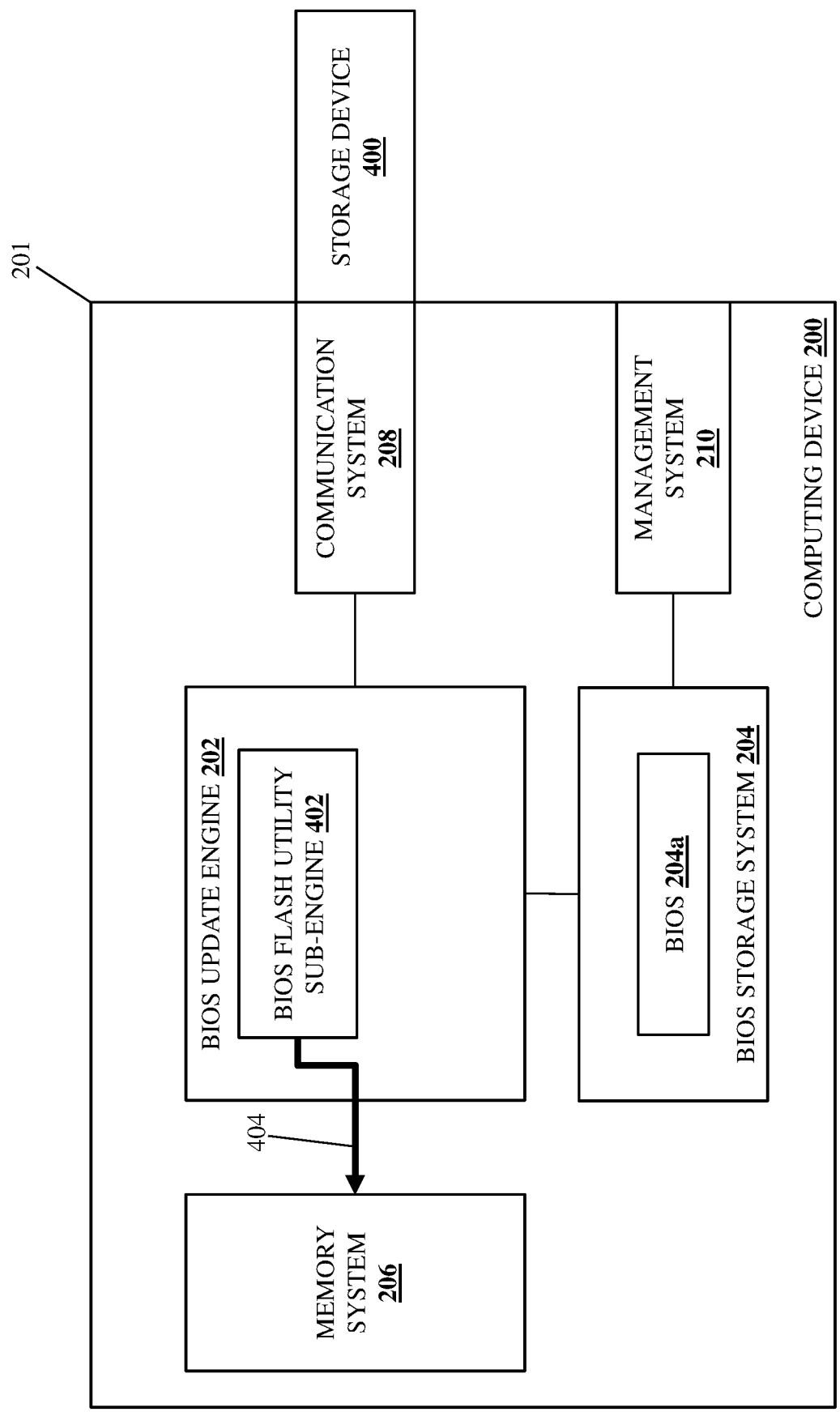
(Prior art) FIG. 4B

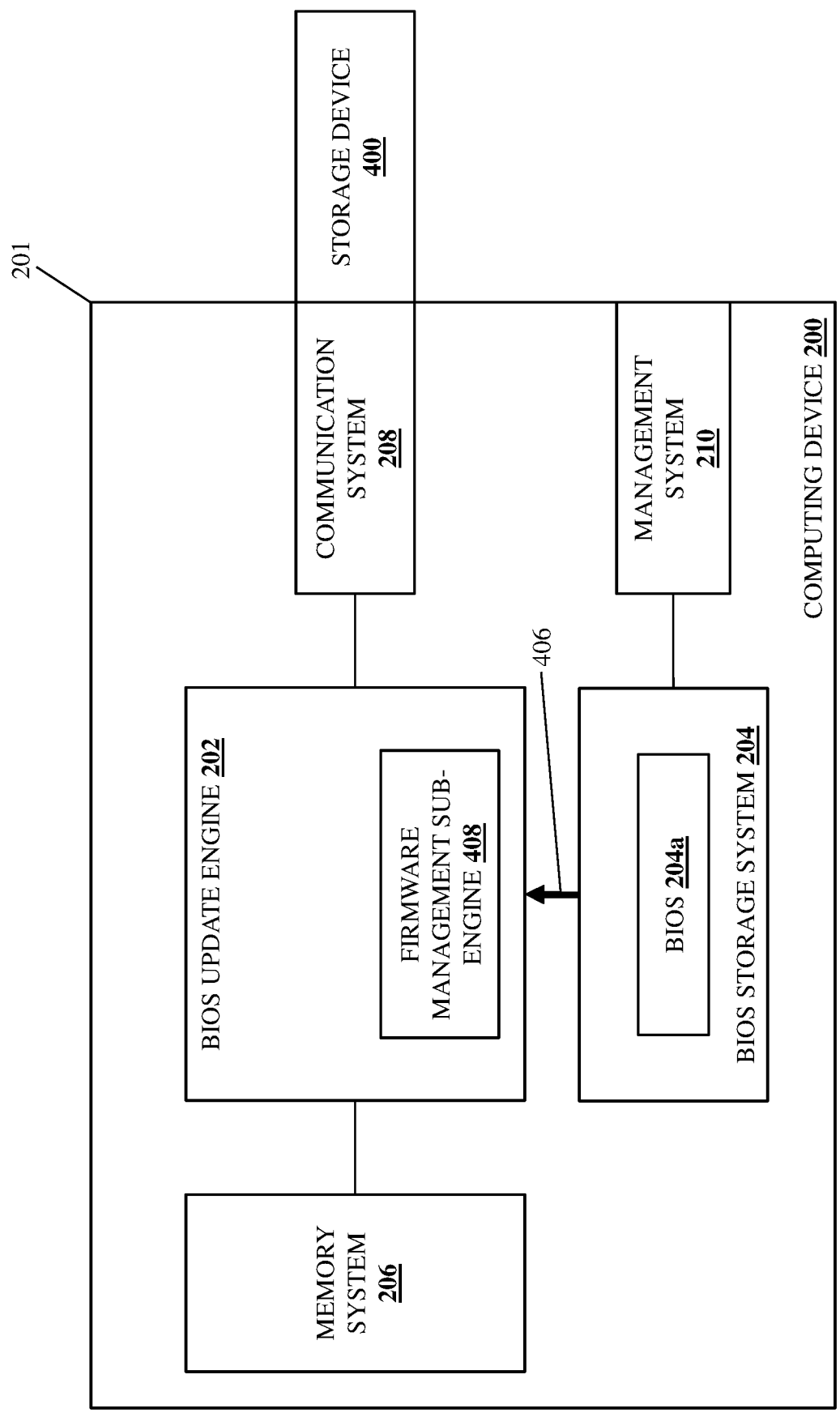
(Prior art) FIG. 4C

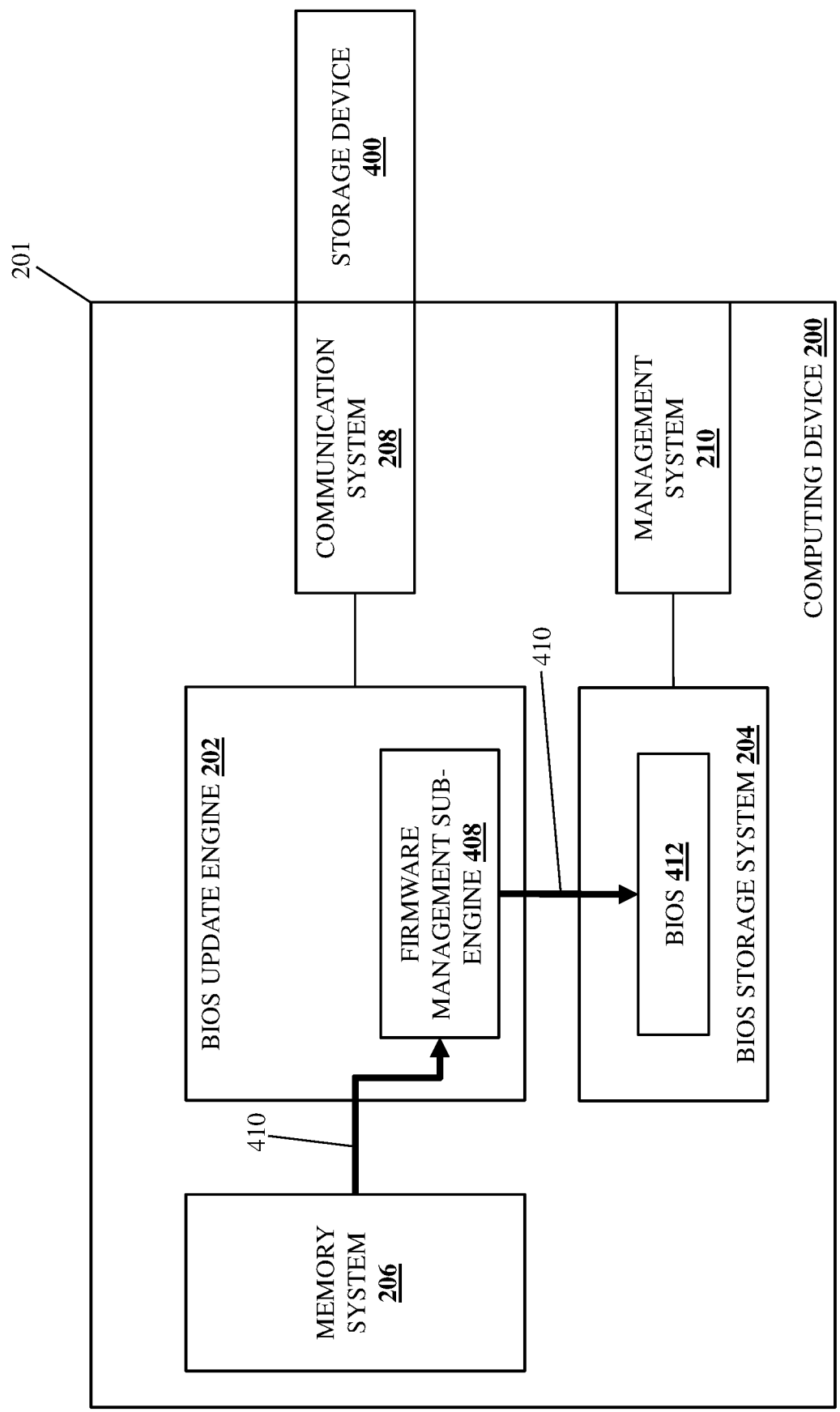
(Prior art) FIG. 4D

BIOS UPDATE SYSTEM

BACKGROUND

The present disclosure relates generally to information handling systems, and more particularly to updating a Basic Input/Output System (BIOS) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art, utilize a Basic Input/Output System (BIOS) to perform hardware initialization during an initialization/boot process (e.g., Power-On Self Test (POST) operations) for the server device, to provide runtime services for operating systems and programs/applications provided on the server device, and/or perform other BIOS operations known in the art. Some server devices support updating of the BIOS either with the assistance of a management system in the server device (e.g., a Baseboard Management Controller (BMC) device such as the integrated DELL® Remote Access Controller (iDRAC) available on server devices provided by DELL® Inc. of Round Rock, Texas, United States), or independent of the management system in the server device, and the updating of the BIOS independent of the management system in server devices can raise issues.

For example, the management-system-independent BIOS updates discussed above are conventionally implemented as a Remote BIOS Update (RBU) in which a BIOS flash utility retrieves BIOS update information (e.g., BIOS update "capsule(s)") and stores it in a volatile memory system in the server device, and then causes a "warm" reboot of the server device (e.g., a "restart" of the server device that does not interrupt power to the server device, and often does not initiate POST operations, as is done in a "cold" reboot). Subsequent to the warm reboot and early in the immediately subsequent initialization/boot of the server device (e.g., relatively early in POST operations), a Firmware Management Protocol (FMP) may be used to retrieve and coalesce the BIOS update information (e.g., the BIOS update "capsule(s)" discussed above) to generate a BIOS update payload, and update the BIOS using the BIOS update payload. However, such conventional BIOS update operations require that the contents of the memory system in the server device (e.g., the BIOS update information stored therein) be preserved across the "warm" reboot (e.g., by Memory Reference Code (MRC) provided with the chipset in the server device), which can raise issues.

For example, conventional RBU techniques are often not reliable with regard to preserving the BIOS update information in the memory system across the "warm" reboot discussed above. In some situations, the MRC discussed above can introduce bugs or other code defects that operate to clear the contents of the memory system in the server device during the "warm" reboot, thus erasing the BIOS update information and preventing the BIOS update. In other situations, feature additions (e.g., the Memory Over-Ride (MOR) feature provided in the WINDOWS® operating system available from MICROSOFT® corporation of Redmond, Washington, United States that includes a security feature that causes the operating system to instruct the BIOS to always clear the memory system in the server device when performing initialization/boot operations) may operate to clear the contents of the memory system in the server device during the "warm" reboot, thus erasing the BIOS update information and preventing the BIOS update. In yet other situations, a memory configuration change or error condition in the server device can promote the "warm" reboot to a "cold" reboot, thus erasing the BIOS update information and preventing the BIOS update.

Accordingly, it would be desirable to provide a BIOS update system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) update engine that is configured to: receive a BIOS update instruction; provide, in response to receiving the BIOS update instruction, a BIOS update identifier in a non-volatile storage device that is coupled to the processing system and that is accessible to a BIOS that is coupled to the processing system; provide, in response to receiving the BIOS update instruction, a Unified Extensible Firmware Interface (UEFI) variable for the BIOS that identifies a location of BIOS update information in a storage device that is coupled to the processing system; cause, subsequent to providing the BIOS update identifier in the non-volatile storage device and providing the UEFI variable for the BIOS, a first reboot; identify, subsequent to the first reboot, the BIOS update identifier in the non-volatile storage device; retrieve, in response to identifying the BIOS update identifier and using the location of the BIOS update information in the storage device identified by the UEFI variable, the BIOS update information; update the BIOS using the BIOS update information; and cause, subsequent to updating the BIOS, a second reboot.

BRIEF DESCRIPTION OF THE DRAWINGS

FIG. 4B is a schematic view illustrating an embodiment of the computing device of FIG. 2 performing a conventional BIOS update.

FIG. 4C is a schematic view illustrating an embodiment of the computing device of FIG. 2 performing a conventional BIOS update.

FIG. 4D is a schematic view illustrating an embodiment of the computing device of FIG. 2 performing a conventional BIOS update.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
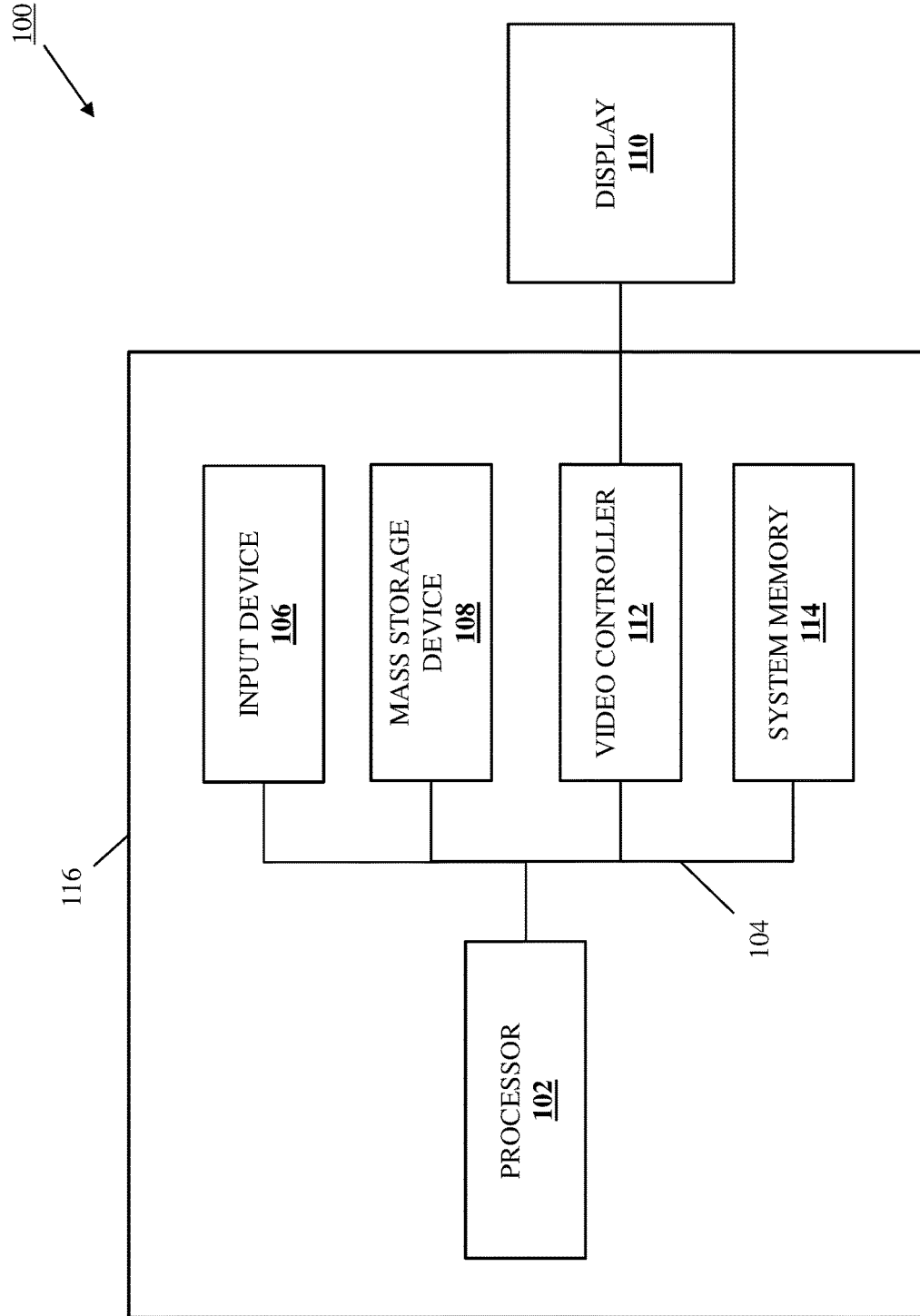
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
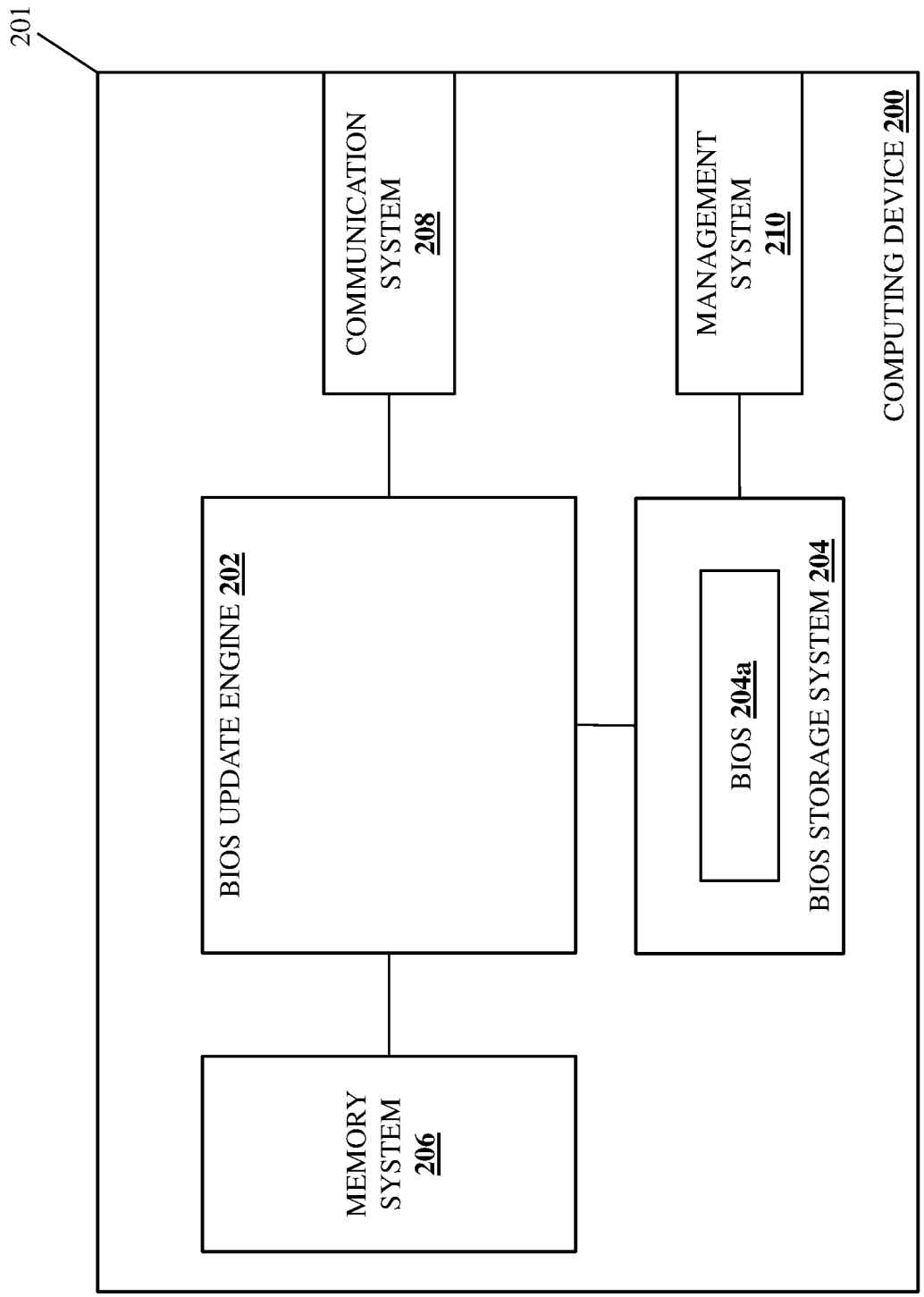
FIG. 2 is a schematic view illustrating an embodiment of a computing device that may include the BIOS update system of the present disclosure.

Referring now to FIG. 2, an embodiment of a computing device 200 is illustrated that may include the BIOS update system of the present disclosure. In an embodiment, the computing device 200 may be provided by the IHS 100 discussed above with reference to FIG. 1 and/or may include some or all of the components of the IHS 100, and in the specific examples discussed below is described as being provided by a server device. However, while illustrated and discussed as being provided by a server device, one of skill in the art in possession of the present disclosure will recognize that the functionality of the computing device 200 discussed below may be provided by desktop computing devices, laptop/notebook computing devices, tablet computing devices, mobile phones, networking devices (e.g., switch devices, router devices, etc.), storage systems, and/other computing devices that are configured to operate similarly as the computing device 200 discussed below.

In the illustrated embodiment, the computing device 200 includes a chassis 201 that houses the components of the computing device 200, only some of which are illustrated and described below. For example, the chassis 201 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a BIOS update engine 202 that is configured to perform the functionality of the BIOS update engines and/or BIOS update subsystems discussed below. In the specific examples discussed below, the BIOS update engine 202 is described as retrieving and executing code to provide a BIOS flash utility sub-engine (e.g., a UEFI shell update utility) and a firmware management sub-engine (e.g., executing a Firmware Management Protocol (FMP)) and thus may include any processing system/memory system combination (e.g., including BIOS firmware that provides the BIOS discussed below) that one of skill in the art in possession of the present disclosure would recognize as providing BIOS update information authentication, BIOS updates, and/or any other functionality described below. However, while specific examples are described below, one of skill in the art in possession of the present disclosure will appreciate that a variety of BIOS update techniques may be used to enable the functionality of the BIOS update engine 202 described below while remaining within the scope of the present disclosure as well.

As illustrated, the chassis 201 may also house a BIOS storage system 204 that is coupled to the BIOS update engine 202 (e.g., via a coupling between the BIOS storage system 204 and the processing system) and that may be provided by or included on a Serial Peripheral Interface (SPI) chip and/or other BIOS storage systems that would be apparent to one of skill in the art in possession of the present disclosure. As illustrated, a BIOS 204a may be included in the BIOS storage system 204, and one of skill in the art in possession of the present disclosure will appreciate how the inclusion of the BIOS 204a in the BIOS storage system 204 in the schematic illustration of FIG. 2 may indicate both BIOS code that is stored in the BIOS storage system 204 (e.g., the SPI chip) and BIOS processing functionality that executes that BIOS code to provide the BIOS 204a (e.g., by the BIOS firmware providing the BIOS update engine 202 in the example described above). However, while a specific example is illustrated and described, one of skill in the art in possession of the present disclosure will appreciate how the BIOS 204a of the present disclosure may be provided in a variety of manners that will fall within the scope of the present disclosure as well.

In the illustrated embodiment, the chassis 201 may also house a memory system 206 that is coupled to the BIOS update engine 202 (e.g., via a coupling between the memory system 206 and the processing system) and that may be provided by volatile Dynamic Random Access Memory (DRAM) memory devices and/or other volatile memory systems that would one of skill in the art in possession of the present disclosure would recognize as being included in computing devices. The chassis 201 may also house a communication system 208 that is coupled to the BIOS update engine 202 (e.g., via a coupling between the communication system 208 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

In the illustrated embodiment, the chassis 201 may also house a management system 210 that is coupled to the BIOS storage system 204/BIOS 204a and that may be provided by a Baseboard Management Controller (BMC) device such as an integrated DELL® Remote Access Controller (IDRAC) available in server device provided by DELL® Inc. of Round Rock, Texas, United States, and/or other management systems that would be apparent to one of skill in the art in possession of the present disclosure. As discussed above and as will be appreciated by one of skill in the art in possession of the present disclosure, the management system 210 may be configured to provide for the update of the BIOS 204a in the BIOS storage system 204 using a variety of management-system-based BIOS update techniques known in the art, and thus those management-system-based BIOS updates are not described in detail below. Furthermore, one of skill in the art in possession of the present disclosure will appreciate that the management system 210 may be omitted from the computing device 200 in some embodiments. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BIOS update functionality discussed below, while remaining within the scope of the present disclosure as well.

Figure 3:
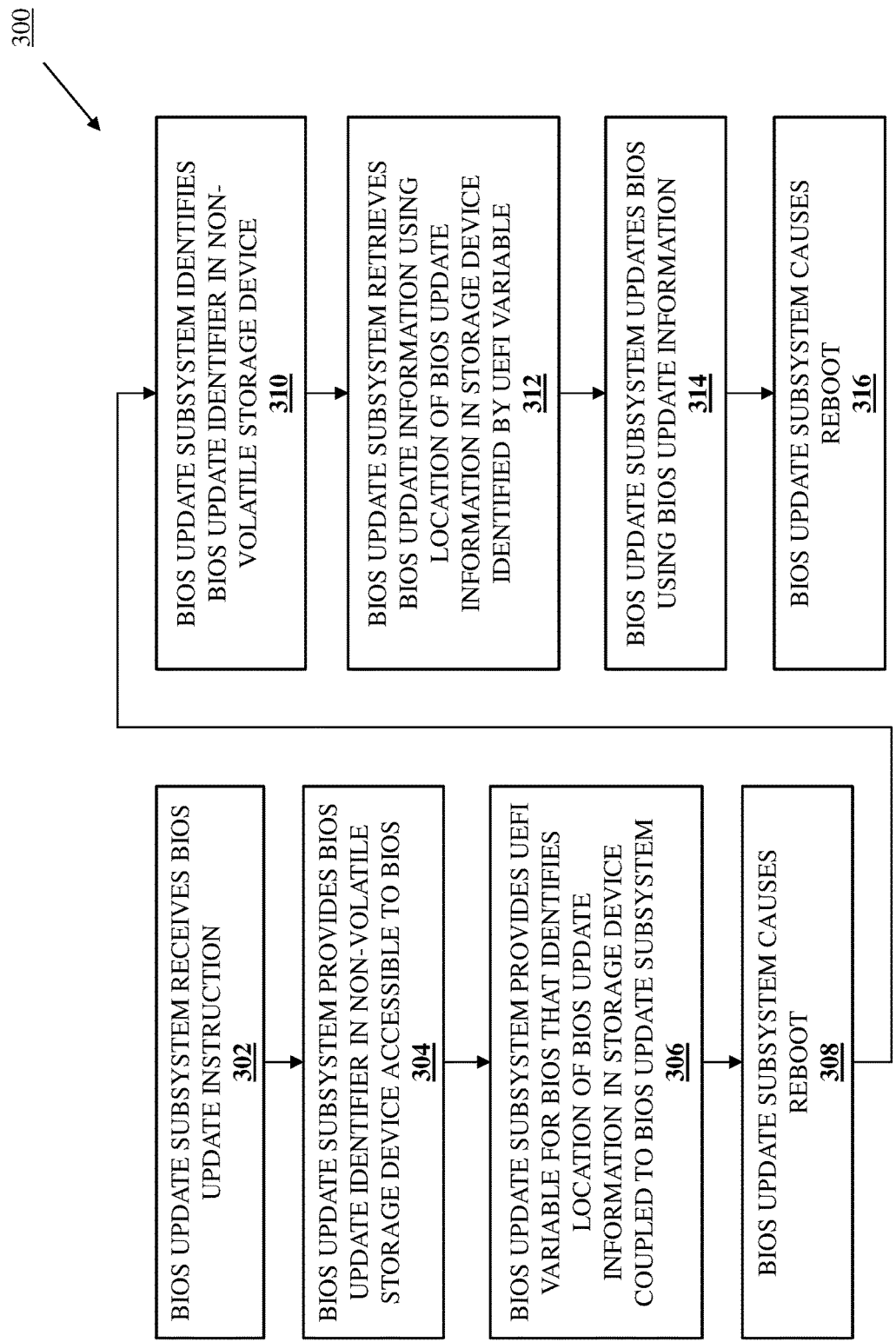
FIG. 3 is a flow chart illustrating an embodiment of a method for updating a BIOS in a computing device.

Referring now to FIG. 3, an embodiment of a method 300 for updating a BIOS in a computing device is illustrated. As discussed below, the systems and methods of the present disclosure provide for the updating of a BIOS in a computing device without the need to preserve the contents of a volatile memory system in the computing device across a reboot of the computing device. For example, the BIOS update system of the present disclosure may include a BIOS update subsystem that is coupled to a memory system and a BIOS. The BIOS update subsystem receives a BIOS update instruction and, in response, provides a BIOS update identifier in a non-volatile storage device that is accessible to the BIOS, provides a UEFI variable for the BIOS that identifies a location of BIOS update information in a storage device that is coupled to the BIOS update subsystem, and then causes a first reboot. Subsequent to the first reboot, the BIOS update subsystem identifies the BIOS update identifier in the non-volatile storage device and, in response, uses the location of the BIOS update information in the storage device identified by the UEFI variable to retrieve the BIOS update information. The BIOS update subsystem then updates the BIOS using the BIOS update information, and then causes a second reboot. As such, the BIOS updates provided according to the teachings of the present disclosure have enhanced reliability relative to conventional BIOS update systems as they are not dependent on warm reboots and/or properly operating Memory Reference Code in the chipset of the computing device to maintain BIOS update information for the BIOS update in a volatile memory system.

Figure 4A:
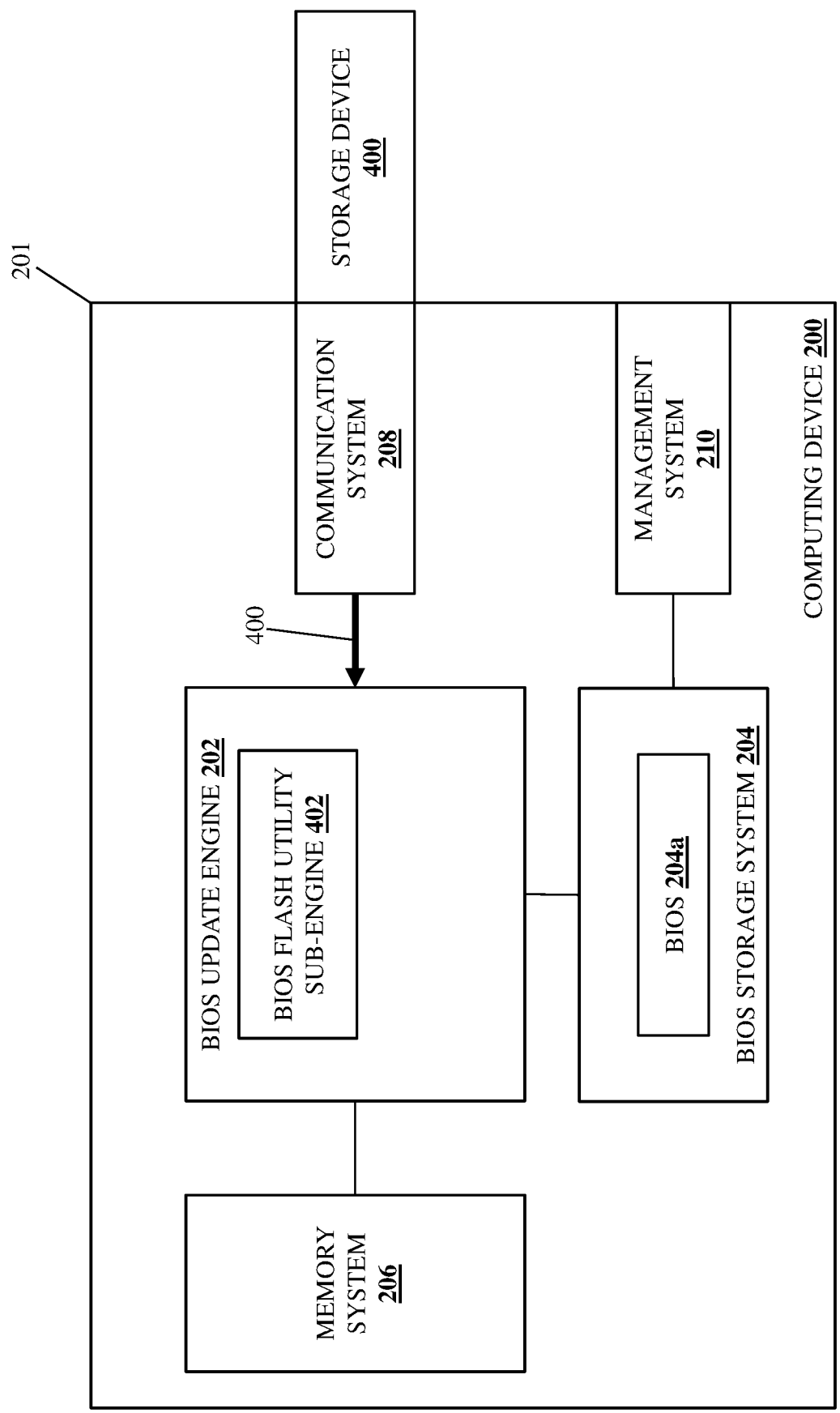
FIG. 4A is a schematic view illustrating an embodiment of the computing device of FIG. 2 performing a conventional BIOS update.

With reference to FIGS. 4A-4D, an embodiment of a conventional BIOS update performed using the computing device 200 of FIG. 2 is illustrated for purposes of comparison to the BIOS updates provided according to the teachings of the present disclosure. With reference to FIG. 4A, a storage device 400 including BIOS update information for updating the BIOS 204a in the BIOS storage system 204 of the computing device 200 may be connected to the communication system 208 on the computing device 200. During runtime or subsequent to initializing/booting the computing device 200 to a UEFI shell update utility (e.g., which provides a boot environment used to update the BIOS 204a without providing an operating system on the computing device 200), the BIOS update engine 202 may perform BIOS flash utility code retrieval operations 400 that may include retrieving BIOS flash utility code from the storage device 400 via the communication system 208, and executing that BIOS flash utility code to provide a BIOS flash utility sub-engine 402 in the BIOS update engine 202. As will be appreciated by one of skill in the art in possession of the present disclosure, the BIOS flash utility sub-engine 402 may include BIOS update capsule files and/or other BIOS update information that is configured for use in updating the BIOS 204a.

With reference to FIG. 4B, the BIOS flash utility sub-engine 402 provided by the BIOS update engine 202 may then perform BIOS update information storage operations 404 that include storing the BIOS update capsule files and/or other BIOS update information in the memory system 206. Following the storage of the BIOS update information in the memory system 206, the BIOS flash utility sub-engine 402 provided by the BIOS update engine 202 may trigger or otherwise cause a "warm" reboot of the computing device 200, which as discussed above may provide for a "restart" of the computing device 200 that does not interrupt power to the computing device 200, and often does not initiate POST operations, as is done in a "cold" reboot.

With reference to FIG. 4C, following the "warm" reboot of the computing device 200, the BIOS update engine 202 may perform firmware management protocol code retrieval operations 406 that may include retrieving firmware management protocol code from the BIOS storage system 204, and executing that firmware management protocol code to provide a firmware management sub-engine 408 in the BIOS update engine 202. With reference to FIG. 4D, the firmware management sub-engine 408 in the BIOS update engine 202 may then perform BIOS update operations 410 that may include retrieving the BIOS update capsule files and/or other BIOS update information from the memory system 206, coalescing the BIOS update capsule files and/or other BIOS update information to generate a BIOS update payload, and then using the BIOS update payload to update the BIOS 204a in the BIOS storage system 204 to provide a BIOS 412.

As discussed above, such conventional BIOS update techniques are often not reliable with regard to preserving the BIOS update capsule files and/or other BIOS update information in the memory system 206 across the "warm" reboot discussed above, as Memory Reference Code (MRC) in a chipset of the computing device 200 can introduce bugs or other code defects that operate to clear the contents of the memory system 206 during the "warm" reboot, feature additions (e.g., security features that cause an operating system in the computing device 200 to instruct the BIOS 204a to always clear the memory system 206 when performing initialization/boot operations) may operate to clear the contents of the memory system 206 during the "warm" reboot, or memory configuration changes or error conditions can promote the "warm" reboot to a "cold" reboot, any of which will operate to erase the BIOS update information and preventing the BIOS update. As described below, the BIOS update system of the present disclosure provides for the updating of the BIOS 204a in the computing device 200 without storing the BIOS update capsule files and/or other BIOS update information in the memory system 206, eliminating the need to preserve the contents of the memory system 206 across the reboot of the computing device 200, thus enhancing the reliability of the BIOS update relative to conventional BIOS update systems as it is not dependent on warm reboots and/or properly operating Memory Reference Code in the chipset of the computing device to maintain BIOS update capsule files and/or other BIOS update information for the BIOS update in the memory system 206.

Figure 5A:
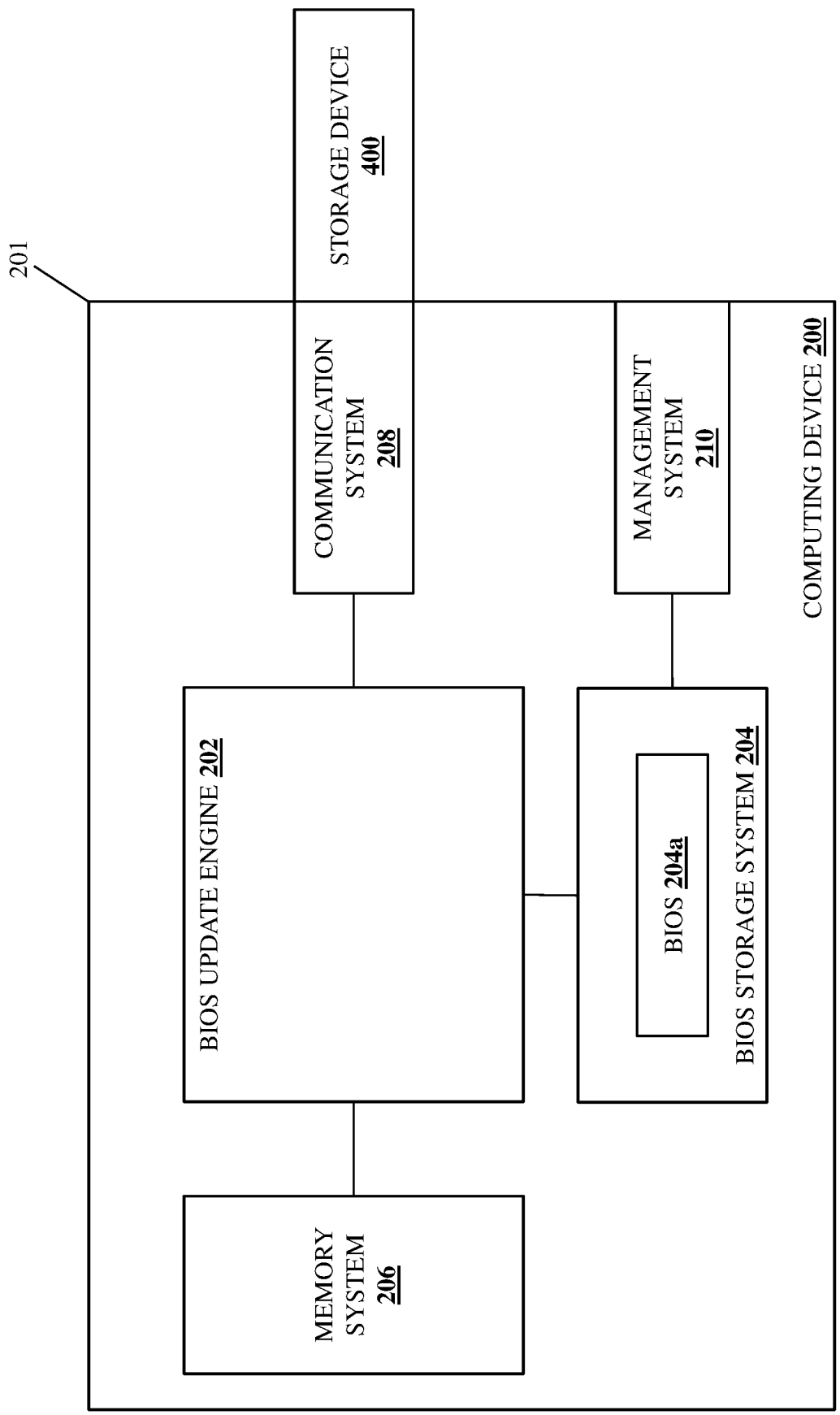
FIG. 5A is a schematic view illustrating an embodiment of the computing device of FIG. 2 operating during the method of FIG. 3.

The method 300 begins at block 302 where a BIOS update subsystem receives a BIOS update instruction. With reference to FIG. 5A, in an embodiment, an administrator or other user of the computing device 200 may connect a storage device 400 to the communication system 208 on the computing device 200. As discussed below, the storage device 400 may store BIOS flash utility code that may include BIOS update capsule files and/or other BIOS update information for updating the BIOS 204a, and/or any other information that one of skill in the art in possession of the present disclosure would recognize as providing for the functionality described below. In a specific example, the storage device 400 may be provided by a Universal Serial Bus (USB) flash-based storage device. However, one of skill in the art in possession of the present disclosure will appreciate how the storage device 400 may be provided by a Hard Disk Drive (HDD) storage device, a Solid State Drive (SDD) storage device, and/or any other storage devices that would be apparent to one of skill in the art in possession of the present disclosure. Furthermore, while illustrated and described as being connected to the communication system 208 on the computing device 200, one of skill in the art in possession of the present disclosure will appreciate that the storage device 400 may be housed in the chassis 201 of the computing device 200 (e.g., as an integrated HDD storage device, SSD storage device, and/or other storage device that would be apparent to one of skill in the art in possession of the present disclosure) while remaining within the scope of the present disclosure as well.

In an embodiment, at block 302, the BIOS update engine 202 in the computing device 202 may receive a BIOS update instruction. For example, during runtime of the computing device 200, the BIOS update engine 202 may be provided (at least in part) by an operating system in the computing device 200, and the administrator or other user of the computing device 200 may provide the BIOS update instruction to that operating system. In another example, the administrator or other user of the computing device 200 may provide the BIOS update instruction to the BIOS update engine 202 by initializing/booting the computing device 200 to a UEFI shell update utility that provides (at least in part) the BIOS update engine 202 as part of an initialization/boot environment that is used to update the BIS 204a without providing an operating system on the computing device 200. However, while two specific examples of providing a BIOS update instruction to the BIOS update engine 202 have been described, one of skill in the art in possession of the present disclosure will appreciate how the BIOS updates of the present disclosure may be instructed and/or initiated in a variety of manners that will fall within the scope of the present disclosure as well.

Figure 5B:
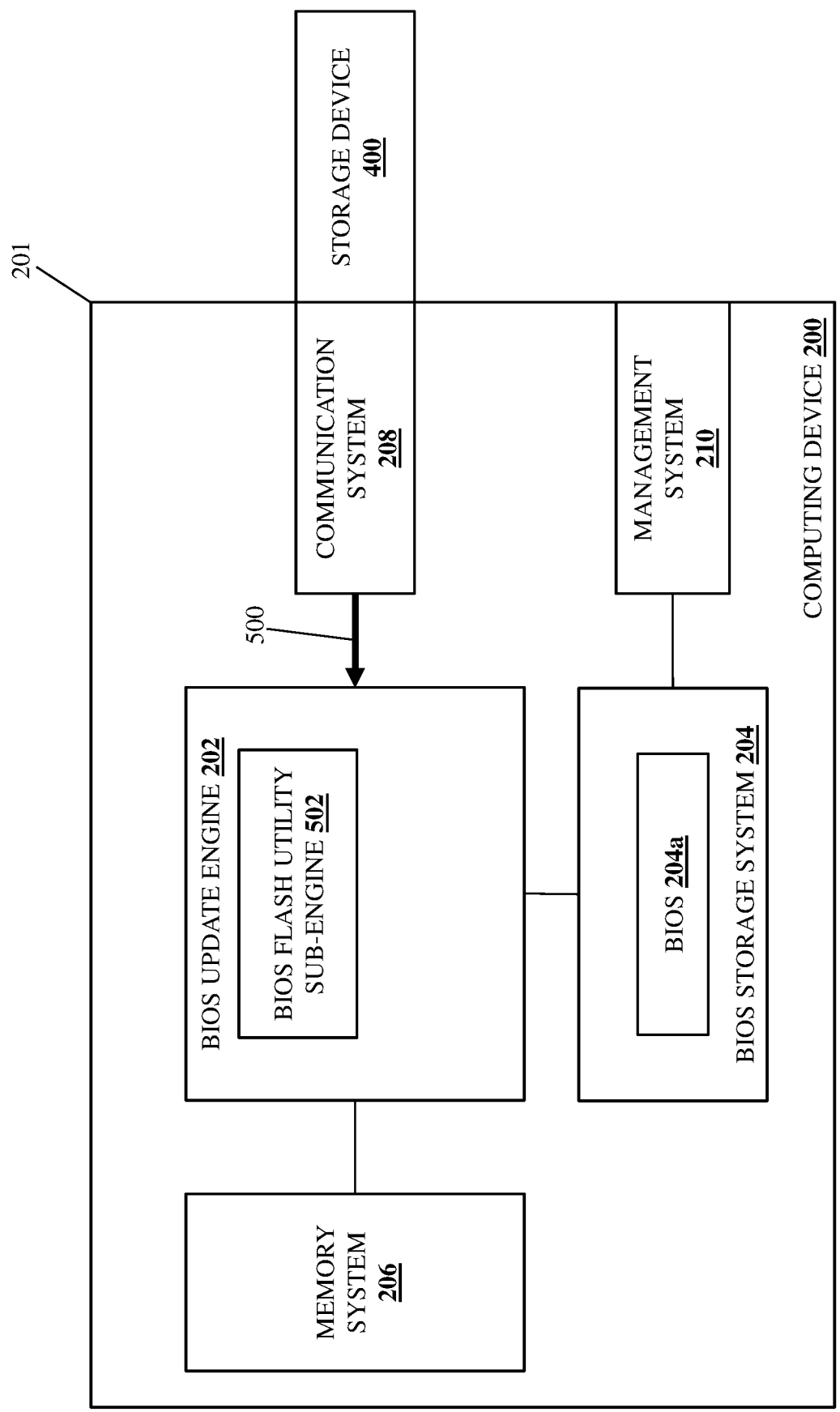
FIG. 5B is a schematic view illustrating an embodiment of the computing device of FIG. 2 operating during the method of FIG. 3.

With reference to FIG. 5B, in response to receiving the BIOS update instruction, the BIOS update engine 202 in the computing device 200 may perform BIOS flash utility code retrieval operations 500 that may include retrieving BIOS flash utility code from the storage device 400 via the communication system 208 (or directly from the storage device 400 when the storage device 400 is housed in the chassis 201 of the computing device 200), and executing that BIOS flash utility code to provide a BIOS flash utility sub-engine 502 in the BIOS update engine 202. As discussed above, the BIOS flash utility code, and thus the BIOS flash utility sub-engine 502, may include BIOS update capsule files and/or other BIOS update information that is configured for use in updating the BIOS 204a, although one of skill in the art in possession of the present disclosure will appreciate how the BIOS flash utility sub-engine 502 of the present disclosure need not include the BIOS update capsule files and/or other BIOS update information that is configured for use in updating the BIOS 204a while remaining within the scope of the present disclosure as well.

Figure 5C:
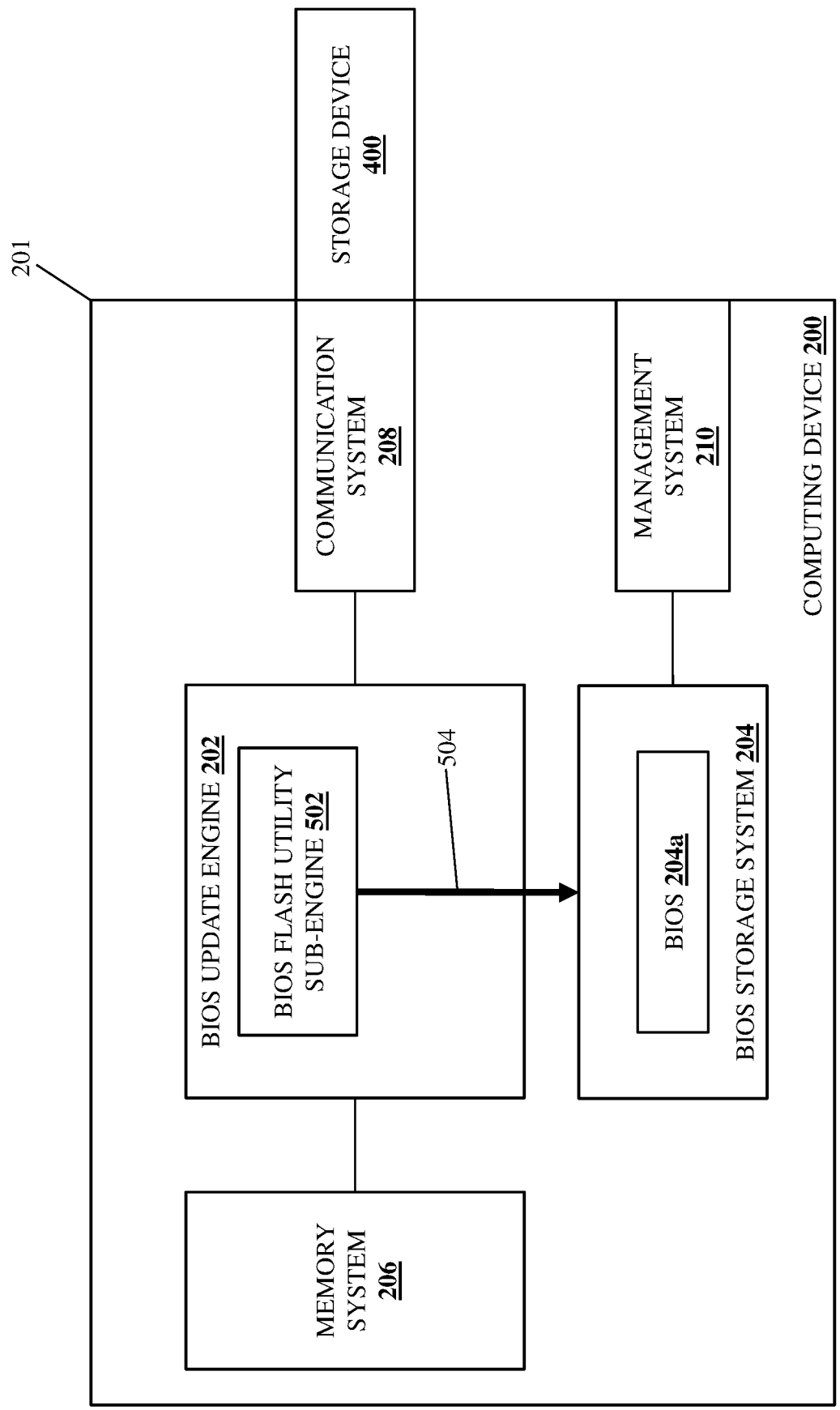
FIG. 5C is a schematic view illustrating an embodiment of the computing device of FIG. 2 operating during the method of FIG. 3.

The method 300 then proceeds to block 304 where the BIOS update subsystem provides a BIOS update identifier in a non-volatile storage device accessible to a BIOS. With reference to FIG. 5C, in an embodiment of block 304, the BIOS flash utility sub-engine 502 provided by the BIOS update engine 202 may perform BIOS update identifier provisioning operations 504 that may include setting a BIOS update flag or providing some other BIOS update identifier in a non-volatile storage device that is illustrated in FIG. 5C as being included in the BIOS storage system 204 (e.g., a non-volatile storage device provided in the SPI chip that stores the BIOS 204a). However, while a specific BIOS-accessible non-volatile storage device has been illustrated and described, one of skill in the art in possession of the present disclosure with recognize that providing the BIOS update identifier in a Complementary Meta Oxide Semiconductor (CMOS)-based storage device in the computing device 200 and/or other BIOS-accessible non-volatile storage devices will fall within the scope of the present disclosure as well. Furthermore, while specific examples of the provisioning of a BIOS update identifier for the BIOS 204a has been described, one of skill in the art in possession of the present disclosure will appreciate how the BIOS 204a may be informed of the BIOS update of the present disclosure during an immediately subsequent initialization/boot of the computing device 200 (discussed in further detail below) using a variety of techniques that will fall within the scope of the present disclosure as well.

Figure 5D:
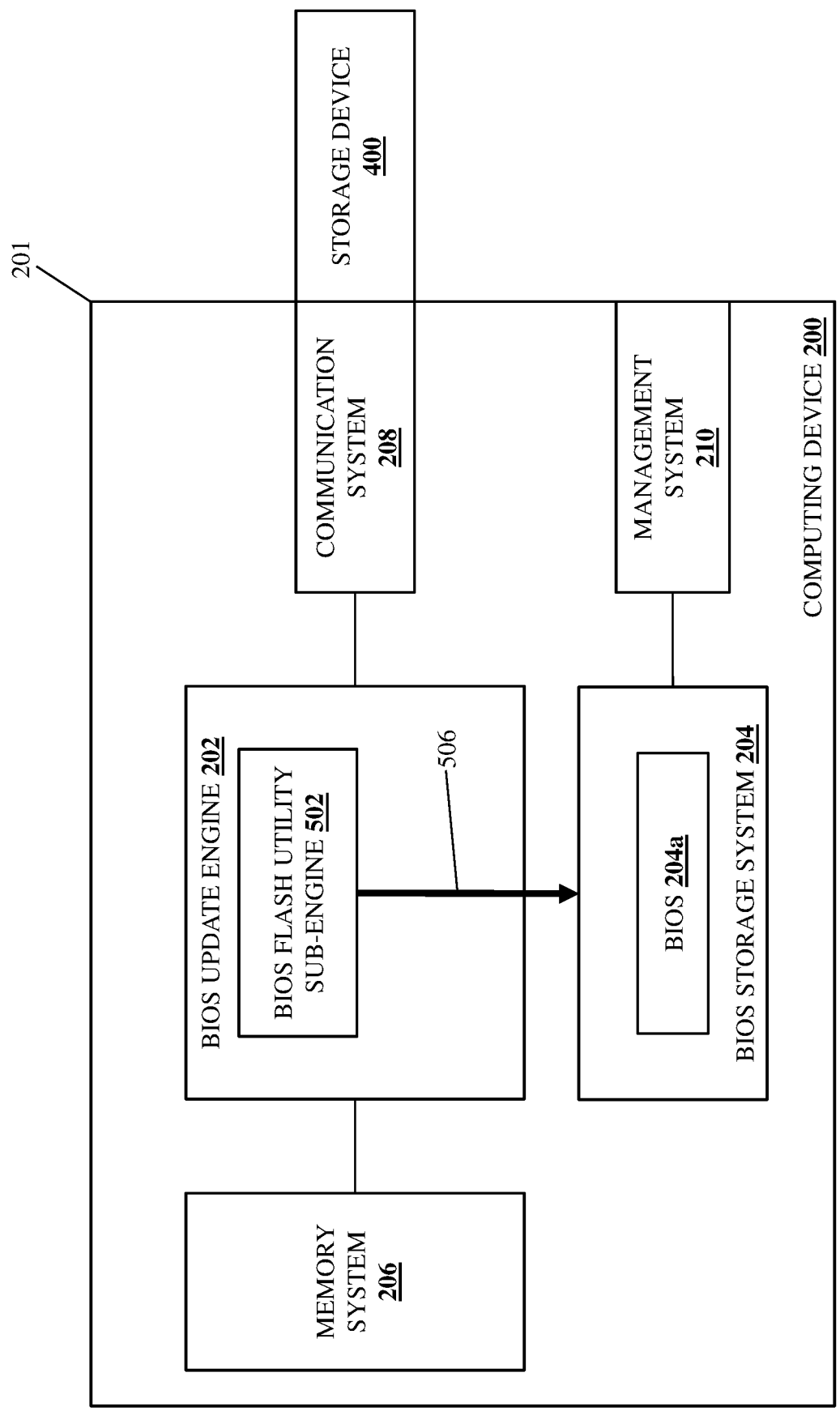
FIG. 5D is a schematic view illustrating an embodiment of the computing device of FIG. 2 operating during the method of FIG. 3.

The method 300 then proceeds to block 306 where the BIOS update subsystem provides a UEFI variable for the BIOS that identifies a location of BIOS update information in a storage device that is coupled to the BIOS update subsystem. With reference to FIG. 5D, in an embodiment of block 306, the BIOS flash utility sub-engine 502 provided by the BIOS update engine 202 may perform UEFI variable provisioning operations 506 that may include creating a UEFI variable (e.g., a "CAPSULE_PATH" UEFI variable) that identifies a device path to the BIOS update capsule files and/or other BIOS update information stored in the storage device 400 (e.g., as part of the BIOS flash utility code in this specific example), and providing that UEFI variable in the BIOS storage system 204 (e.g., in a Non-Volatile Random Access Memory (NVRAM) that is included in the BIOS storage system 204 (e.g., a SPI chip) and configured to store UEFI variables). Continuing with the specific example in which the BIOS update capsule files and/or other BIOS update information is included in the BIOS flash utility code stored in the storage device 400 provided by a USB flash-based storage device, the UEFI variable created at block 306 may identify a device path that points to the USB flash-based storage device, a directory that includes the BIOS flash utility code, and the file name of the BIOS flash utility. However, while specific examples of the creating and provisioning of a UEFI variable identifying a location of BIOS update information has been described, one of skill in the art in possession of the present disclosure will appreciate how the location of BIOS update information for the BIOS update of the present disclosure in the storage device 400 may be identified using a variety of techniques that will fall within the scope of the present disclosure as well.

The method 300 then proceeds to block 308 where the BIOS update subsystem causes a reboot. In an embodiment, at block 308 and following the provisioning of the BIOS update identifier at block 304 and the provisioning of the UEFI variable at block 306, the BIOS flash utility sub-engine 502 provided by the BIOS update engine 202 may trigger or otherwise cause a reboot of the computing device 200. In some examples, the reboot of the computing device 200 at block 308 may be a "warm" reboot of the computing device 200, which as discussed above may provide for a "restart" of the computing device 200 that does not interrupt power to the computing device 200, and often does not initiate POST operations, as is done in a "cold" reboot. However, one of skill in the art in possession of the present disclosure will appreciate how the reboot of the computing device 200 at block 308 may be a "cold" reboot of the computing device 200, as the BIOS update capsule files and/or other BIOS update information is not stored in the memory system 206, and thus the erasure of the contents of the memory system 206 that occurs during "cold" reboots (or the possibility that such erasures may occur during "warm" reboots as discussed above) is not a concern.

Figure 5E:
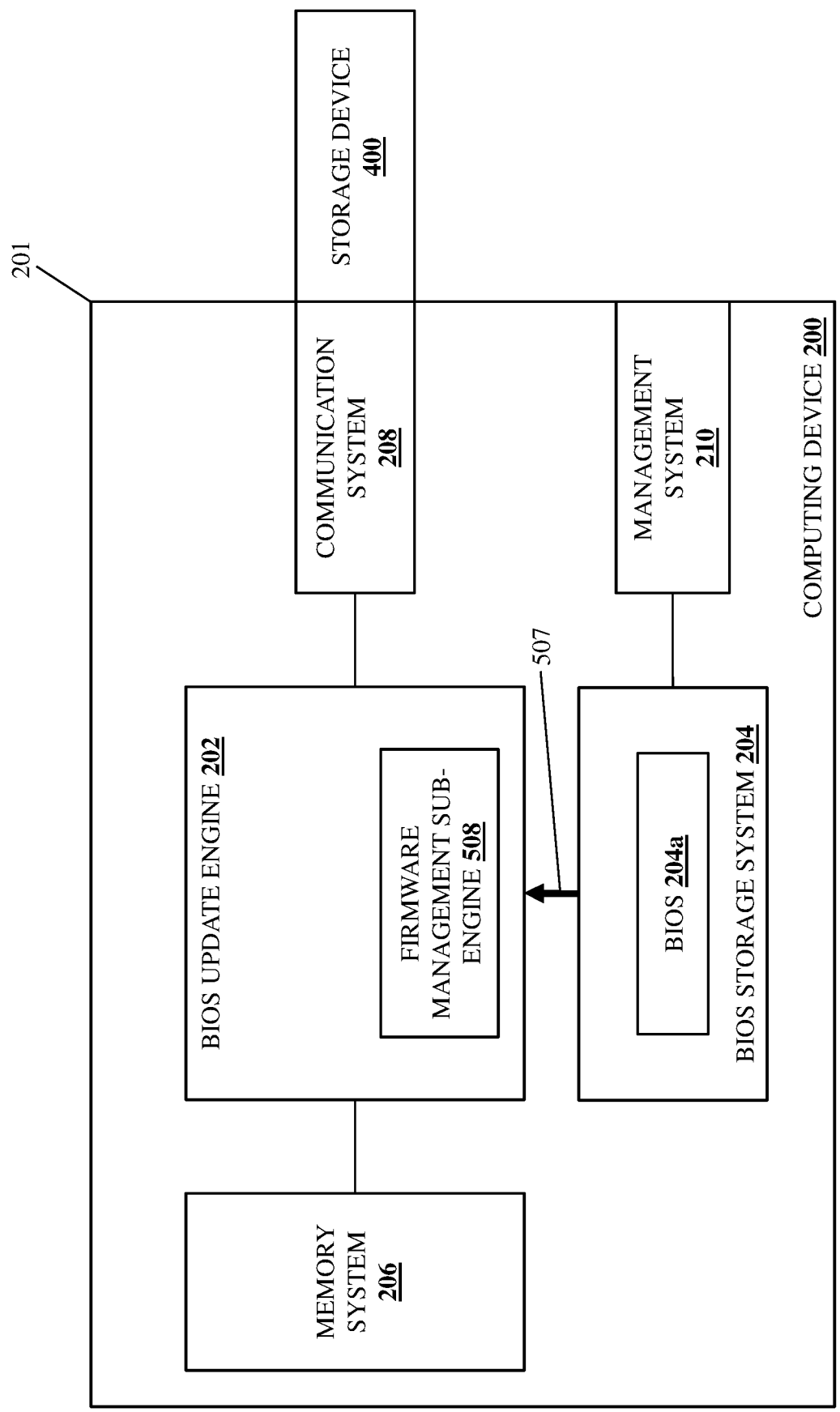
FIG. 5E is a schematic view illustrating an embodiment of the computing device of FIG. 2 operating during the method of FIG. 3.

The method 300 then proceeds to block 310 where the BIOS update subsystem identifies the BIOS update identifier in the non-volatile storage device. With reference to FIG. 5E, in an embodiment of block 310 and following the reboot at block 308, the BIOS update engine 202 in the computing device 200 may perform firmware management protocol code retrieval operations 507 that may include retrieving firmware management protocol code from the BIOS storage device 204 (e.g., a SPI chip), and executing that firmware management protocol code to provide a firmware management sub-engine 508 in the BIOS update engine 202. However, in other embodiments, rather than immediately providing the firmware management sub-engine 508 following the reboot at block 308 to retrieve the BIOS update capsule files and/or other BIOS update information, build the BIOS update payload, and perform the BIOS update as discussed below, the BIOS update engine 202 may retrieve the BIOS update capsule files and/or other BIOS update information, build the BIOS update payload, and then provide the firmware management sub-engine 508 to perform the BIOS update while remaining within the scope of the present disclosure as well.

In an embodiment, at block 310, the firmware management sub-engine 508 provided by the BIOS update engine 202 (or the BIOS update engine 202 itself) may identify the BIOS update flag or other BIOS update identifier that was set or otherwise provided at block 304 in the non-volatile storage device that is accessible to the BIOS 204a (e.g., the SPI chip, the CMOS-based storage device, etc.). As will be appreciated by one of skill in the art in possession of the present disclosure, the identification of the BIOS update identifier at block 310 will indicate to the BIOS update engine 202 that a BIOS update is in progress immediately following the reboot of the computing device 200 at block 308.

Figure 5F:
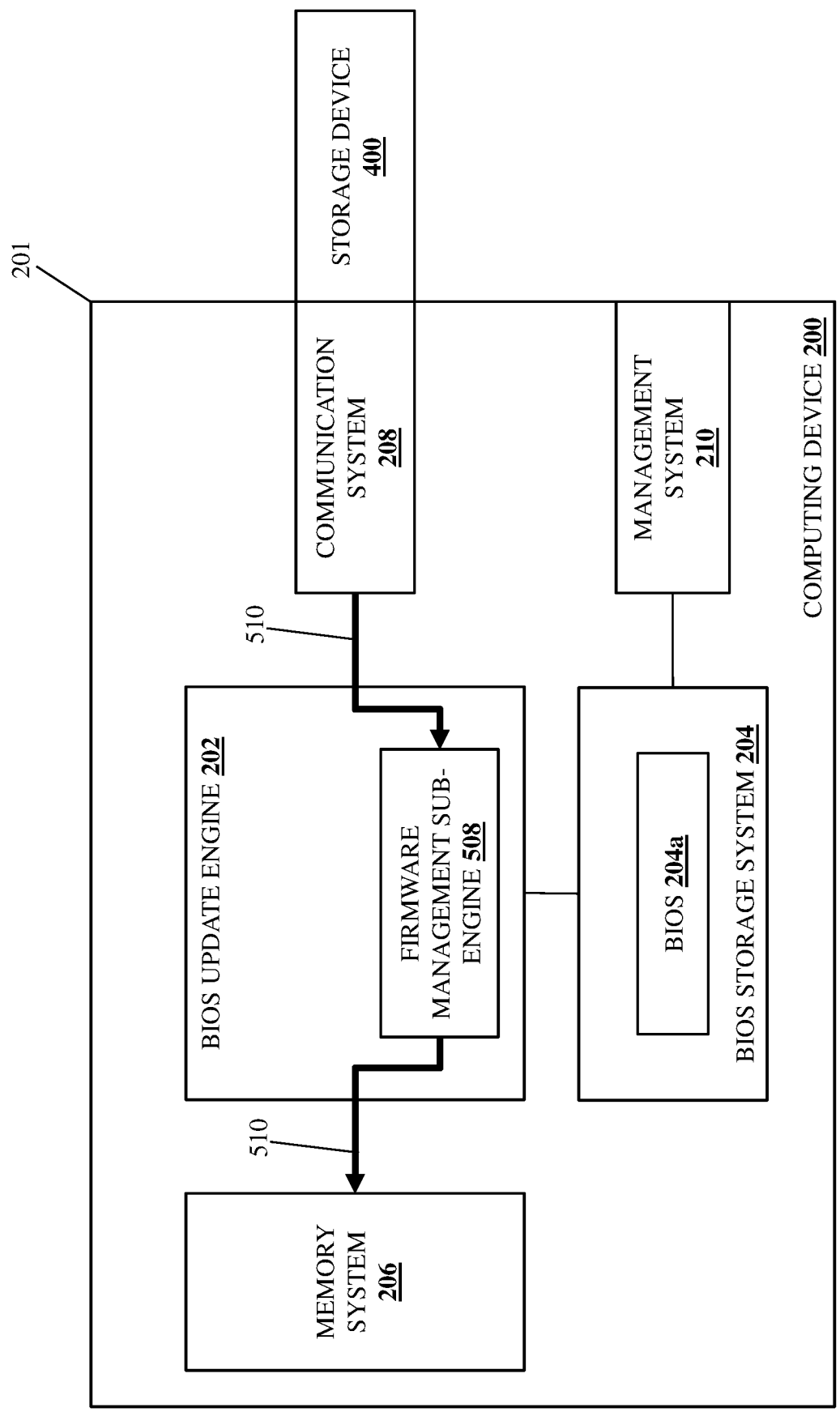
FIG. 5F is a schematic view illustrating an embodiment of the computing device of FIG. 2 operating during the method of FIG. 3.

The method 300 then proceeds to block 312 where the BIOS update subsystem retrieves the BIOS update information using the location of the BIOS update information in the storage device identified by the UEFI variable. With reference to FIG. 5F, in an embodiment of block 312 and in response to identifying the BIOS update identifier, the firmware management sub-engine 508 provided by the BIOS update engine 202 (or the BIOS update engine 202 itself) may perform BIOS update information retrieval operations 510 that may include locating the UEFI variable (e.g., the "CAPSULE_PATH" UEFI variable discussed above) that was provided for the BIOS 204a in the BIOS storage system 204 (e.g., in an NVRAM in a SPI chip) and that identifies a device path to the BIOS update capsule files and/or other BIOS update information stored in the storage device 400 (e.g., as part of the BIOS flash utility code in this specific example), and using that device path to find and retrieve the BIOS update capsule files and/or other BIOS update information stored in the storage device 400. In the illustrated example, the BIOS update information retrieval operations 510 may also include storing the BIOS update capsule files and/or other BIOS update information in the memory system 206.

Figure 5G:
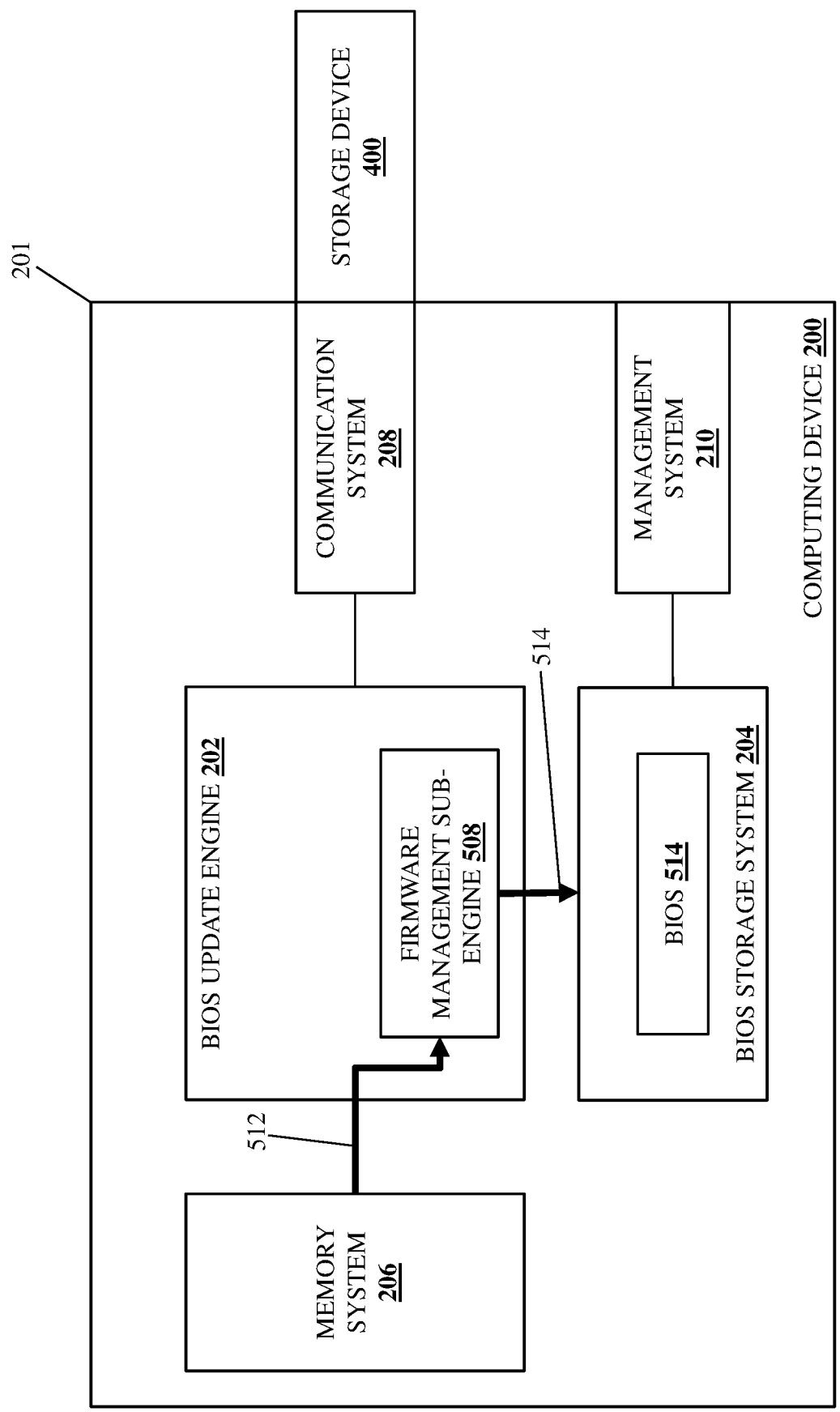
FIG. 5G is a schematic view illustrating an embodiment of the computing device of FIG. 2 operating during the method of FIG. 3.

The method 300 then proceeds to block 314 where the BIOS update subsystem updates the BIOS using the BIOS update information. With reference to FIG. 5G, in an embodiment of block 314, the firmware management sub-engine 508 provided by the BIOS update engine 202 (or the BIOS update engine 202 itself) may perform BIOS update payload generation operations 512 that may include retrieving and coalescing the BIOS update capsule files and/or other BIOS update information that were stored in the memory system 206 at block 312 in order to generate a BIOS update payload. In some embodiments, the firmware management sub-engine 508 provided by the BIOS update engine 202 (or the BIOS update engine 202 itself) may authenticate the BIOS update payload using any of a variety authentication techniques that would be apparent to one of skill in the art in possession of the present disclosure. In some examples, following the generation of the BIOS update payload using the firmware management sub-engine 508 provided by the BIOS update engine 202, the firmware management sub-engine 508 may then perform BIOS update operations 514 that may include updating the BIOS 204a using the BIOS update payload to provide a BIOS 514 in the BIOS storage system 204.

In other examples, following the generation of the BIOS update payload using the BIOS update engine 202, the BIOS update engine 202 may perform the firmware management protocol code retrieval operations 507 discussed above with reference to FIG. 5E to retrieve the firmware management protocol code from the BIOS storage system 204 and use the firmware management protocol code to provide the firmware management sub-engine 508, and then may use the firmware management sub-engine 508 to perform the BIOS update operations 514 that may include updating the BIOS 204a using the BIOS update payload to provide the BIOS 514 in the BIOS storage system 204. As will be appreciated by one of skill in the art in possession of the present disclosure, the BIOS updates operations 514 (e.g., the erasing and writing of the flash storage device in the SPI chip that provides the BIOS storage system 204) may be performed prior to the locking of the BIOS storage system 204 (e.g., the SPI chip) during relatively later POST operations.

The method 300 then proceeds to block 316 where the BIOS update subsystem causes a reboot. In an embodiment, at block 316, the firmware management sub-engine 508 provided by the BIOS update engine 202 may trigger or otherwise cause a reboot of the computing device 200, which one of skill in the art in possession of the present disclosure will recognize will allow the computing device 200 to reboot, reset, and/or otherwise initialize in a manner that allows the updated BIOS 514 to take effect in the computing device 200.

Thus, systems and methods have been described that provide for the updating of a BIOS in a computing device without the need to preserve the contents of a volatile memory system in the computing device across a reboot of the computing device. For example, the BIOS update system of the present disclosure may include a BIOS update subsystem that is coupled to a memory system and a BIOS. The BIOS update subsystem receives a BIOS update instruction and, in response, provides a BIOS update identifier in a non-volatile storage device that is accessible to the BIOS, provides a UEFI variable for the BIOS that identifies a location of BIOS update information in a storage device that is coupled to the BIOS update subsystem, and then causes a first reboot. Subsequent to the first reboot, the BIOS update subsystem identifies the BIOS update identifier in the non-volatile storage device and, in response, uses the location of the BIOS update information in the storage device identified by the UEFI variable to retrieve the BIOS update information. The BIOS update subsystem then updates the BIOS using the BIOS update information, and then causes a second reboot. As such, the BIOS updates provided according to the teachings of the present disclosure have enhanced reliability relative to conventional BIOS update systems as they are not dependent on warm reboots and/or properly operating Memory Reference Code in the chipset of the computing device to maintain BIOS update information for the BIOS update in a volatile memory system.

As will be appreciated by one of skill in the art in possession of the present disclosure, the UEFI specification defines an "UpdateCapsule( )" runtime Application Programming Interface (API) mechanism that provides for the saving of BIOS update capsule files using a predefined name and at a predefined location provided by an EFI system partition include on a Hard Disk Drive (HDD) that is targeted for booting/initialization operations, and the setting of an operating system indication bit to allow the BIOS update capsule files to be used to update the BIOS. However, such mechanisms are not supported by server devices that do not include an HDD. Furthermore, many users "wipe" or otherwise erase the HDD on their server devices when they are first received from a server device manufacturer, thus preventing the use of such mechanisms. Further still, such mechanisms are only available when booting/initializing from HDDs that are formatted with a Globally Unique IDentifier (GUID) Partition Table (GPT) and that include an EFI system partition, and will not work with storage devices like the USB flash-based storage devices discussed above. As such, the BIOS update system of the present disclosure provides several benefits over conventional solutions to the conventional BIOS update system issues discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) update system, comprising:
 a memory system;
 a Basic Input/Output System (BIOS); and
 a BIOS update subsystem that is coupled to the memory system and the BIOS, wherein the BIOS update subsystem is configured to:
  receive a BIOS update instruction;
  execute, in response to receiving the BIOS update instruction, BIOS flash utility code stored in a BIOS update storage device coupled to the BIOS update subsystem to provide a BIOS flash utility subsystem;
  provide, using the BIOS flash utility subsystem, a BIOS update identifier in a non-volatile BIOS storage system that is accessible to the BIOS;
  provide, in the non-volatile BIOS storage system using the BIOS flash utility subsystem, a Unified Extensible Firmware Interface (UEFI) variable that includes a location of BIOS update information in the BIOS flash utility code stored in the BIOS update storage device;
  cause, using the BIOS flash utility subsystem and subsequent to providing the BIOS update identifier and the UEFI variable in the non-volatile BIOS storage system, a first reboot;
  execute, subsequent to the first reboot, firmware management protocol code stored in the non-volatile BIOS storage system to provide a firmware management subsystem;

identify, using the firmware management subsystem, the BIOS update identifier in the non-volatile BIOS storage system;

access, using the firmware management subsystem and in response to identifying the BIOS update identifier, the UEFI variable that includes the location of the BIOS update information in the BIOS flash utility code stored in the BIOS update storage device;

retrieve, using the firmware management subsystem and the location of the BIOS update information in the BIOS flash utility code stored in the BIOS update storage device identified by the UEFI variable, the BIOS update information;

update, using the firmware management subsystem, the BIOS using the BIOS update information; and cause, using the firmware management subsystem and subsequent to updating the BIOS, a second reboot.

2. The system of claim 1, wherein the UEFI variable identifies a BIOS update storage device path that points to the BIOS update storage device, a directory that includes the BIOS flash utility code, and a BIOS flash utility file name for the BIOS flash utility subsystem.

3. The system of claim 1, wherein the first reboot is a cold reboot.

4. The system of claim 1, wherein the BIOS update instruction is received in response to a computing device that includes the BIOS being initialized to a Unified Extensible Firmware Interface (UEFI) shell utility that is configured to enable BIOS updates without an operating system being provided on the computing device.

5. The system of claim 1, wherein the BIOS update storage device is a Universal Serial Bus (USB) flash-based storage device that is coupled to the BIOS update subsystem via a USB connector.

6. The system of claim 1, wherein the non-volatile BIOS storage device is a Serial Peripheral Interface (SPI) storage device that includes BIOS code that provides the BIOS.

7. An Information Handling System (IHS), comprising:
a processing system; and
a memory system that is coupled to the processing system and that includes instructions that, when executed by the processing system, cause the processing system to provide a Basic Input/Output System (BIOS) update engine that is configured to:
receive a BIOS update instruction;
execute, in response to receiving the BIOS update instruction, BIOS flash utility code stored in a BIOS update storage device coupled to the processing system to provide a BIOS flash utility sub-engine;
provide, using the BIOS flash utility sub-engine, a BIOS update identifier in a non-volatile BIOS storage system that is coupled to the processing system and that is accessible to a BIOS that is coupled to the processing system;
provide, in the non-volatile BIOS storage system using the BIOS flash utility sub-engine, a Unified Extensible Firmware Interface (UEFI) variable that includes a location of BIOS update information in the BIOS flash utility code stored in the BIOS update storage device;
cause, using the BIOS flash utility sub-engine and subsequent to providing the BIOS update identifier and the UEFI variable in the non-volatile BIOS storage system, a first reboot;

execute, subsequent to the first reboot, firmware management protocol code stored in the non-volatile BIOS storage system to provide a firmware management sub-engine;

identify, using the firmware management sub-engine, the BIOS update identifier in the non-volatile BIOS storage system;

access, using the firmware management sub-engine and in response to identifying the BIOS update identifier, the UEFI variable that includes the location of the BIOS update information in the BIOS flash utility code stored in the BIOS update storage device;

retrieve, using the firmware management sub-engine and the location of the BIOS update information in the BIOS flash utility code stored in the BIOS update storage device identified by the UEFI variable, the BIOS update information;

update, using the firmware management sub-engine, the BIOS using the BIOS update information; and cause, using the firmware management sub-engine and subsequent to updating the BIOS, a second reboot.

8. The IHS of claim 7, wherein the UEFI variable identifies a BIOS update storage device path that points to the BIOS update storage device, a directory that includes the BIOS flash utility code, and a BIOS flash utility file name for the BIOS flash utility sub-engine.

9. The IHS of claim 8, wherein the BIOS update information is included in BIOS update capsule files.

10. The IHS of claim 7, wherein the first reboot is a cold reboot.

11. The IHS of claim 7, wherein the BIOS update instruction is received in response to the IHS being initialized to a Unified Extensible Firmware Interface (UEFI) shell utility that is configured to enable BIOS updates without an operating system being provided on the IHS.

12. The IHS of claim 7, wherein the BIOS update storage device is a Universal Serial Bus (USB) flash-based storage device that is coupled to the processing system via a USB connector.

13. The IHS of claim 7, wherein the non-volatile BIOS storage device is a Serial Peripheral Interface (SPI) storage device that includes BIOS code that provides the BIOS.

14. A method for updating a Basic Input/Output System (BIOS) in a computing device, comprising:
receiving, by a Basic Input/Output System (BIOS) update subsystem, a BIOS update instruction;
execute, by the BIOS update subsystem in response to receiving the BIOS update instruction, BIOS flash utility code stored in a BIOS update storage device coupled to the BIOS update subsystem to provide a BIOS flash utility subsystem;
providing, by the BIOS update subsystem using the BIOS flash utility subsystem, a BIOS update identifier in a non-volatile BIOS storage system device that is accessible to a BIOS that is coupled to the BIOS update system;
providing, by the BIOS update subsystem in the non-volatile BIOS storage system using the BIOS flash utility subsystem, a Unified Extensible Firmware Interface (UEFI) variable that includes a location of BIOS update information in the BIOS flash utility code stored in the BIOS update storage device;
causing, by the BIOS update subsystem using the BIOS flash utility subsystem and subsequent to providing the BIOS update identifier and the UEFI variable in the non-volatile BIOS storage system, a first reboot;

executing, by the BIOS update subsystem, firmware management protocol code stored in the non-volatile BIOS storage system to provide a firmware management subsystem;

identifying, by the BIOS update subsystem using the firmware management subsystem, the BIOS update identifier in the non-volatile BIOS storage system;

accessing, by the BIOS update subsystem using the firmware management subsystem and in response to identifying the BIOS update identifier, the UEFI variable that includes the location of the BIOS update information in the BIOS flash utility code stored in the BIOS update storage device;

retrieving, by the BIOS update subsystem using the firmware management subsystem and using the location of the BIOS update information in the BIOS flash utility code stored in the BIOS update storage device identified by the UEFI variable, the BIOS update information;

updating, by the BIOS update subsystem using the firmware management subsystem, the BIOS using the BIOS update information; and causing, by the BIOS update subsystem using the firmware management subsystem and subsequent to updating the BIOS, a second reboot.

15. The method of claim 14, wherein the UEFI variable identifies a BIOS update storage device path that points to the BIOS update storage device, a directory that includes the BIOS flash utility code, and a BIOS flash utility file name for the BIOS flash utility subsystem.

16. The method of claim 15, wherein the BIOS update information is included in BIOS update capsule files.

17. The method of claim 14, wherein the first reboot is a cold reboot.

18. The method of claim 14, wherein the BIOS update instruction is received in response to a computing device that includes the BIOS being initialized to a Unified Extensible Firmware Interface (UEFI) shell utility that is configured to enable BIOS updates without an operating system being provided on the computing device.

19. The method of claim 14, wherein the BIOS update storage device is a Universal Serial Bus (USB) flash-based storage device that is coupled to the BIOS update subsystem via a USB connector.

20. The method of claim 14, wherein the non-volatile BIOS storage device is a Serial Peripheral Interface (SPI) storage device that includes BIOS code that provides the BIOS.

* * * * *

UNITED STATES PATENT AND TRADEMARK OFFICE
CERTIFICATE OF CORRECTION

| | | |
|---|---|---|
| PATENT NO. | : 12,379,920 B2 | Page 1 of 1 |
| APPLICATION NO. | : 18/183323 | |
| DATED | : August 5, 2025 | |
| INVENTOR(S) | : Po-Yu Cheng and Wei Liu | |

It is certified that error appears in the above-identified patent and that said Letters Patent is hereby corrected as shown below:

In the Specification

Column 5, Line 47, "(IDRAC)" should read --(iDRAC)--

In the Claims

Column 14, Lines 54-55, Claim 14, "in a non-volatile BIOS storage system device" should be changed to --in a non-volatile BIOS storage system--

Signed and Sealed this
Twenty-first Day of October, 2025

John A. Squires
*Director of the United States Patent and Trademark Office*